United States Patent
Chang

(10) Patent No.: US 7,391,916 B2
(45) Date of Patent: Jun. 24, 2008

(54) QUANTIZATION MATRIX ADJUSTING METHOD FOR QUALITY IMPROVEMENT

(75) Inventor: Yung-Ching Chang, Kao Hsiung County (TW)

(73) Assignee: Silicon Integrated Systems Corp., Hsin-chu (TW)

( * ) Notice: Subject to any disclaimer, the term of this patent is extended or adjusted under 35 U.S.C. 154(b) by 775 days.

(21) Appl. No.: 10/442,151

(22) Filed: May 21, 2003

(65) Prior Publication Data

US 2004/0234149 A1 Nov. 25, 2004

(51) Int. Cl.
 G06K 9/36 (2006.01)
 G06K 9/38 (2006.01)
 H04B 1/66 (2006.01)
(52) U.S. Cl. .................... 382/251; 375/240.03
(58) Field of Classification Search ............... 382/251
 See application file for complete search history.

(56) References Cited

U.S. PATENT DOCUMENTS

| | | | | |
|---|---|---|---|---|
| 5,323,187 A * | 6/1994 | Park | | 375/240.04 |
| 5,404,174 A * | 4/1995 | Sugahara | | 348/700 |
| 5,933,532 A * | 8/1999 | Mihara | | 382/232 |
| 6,026,190 A * | 2/2000 | Astle | | 382/232 |
| 6,111,991 A * | 8/2000 | Ribas-Corbera et al. | | 382/251 |
| 6,222,881 B1 * | 4/2001 | Walker | | 375/240.03 |
| 6,259,739 B1 * | 7/2001 | Kondo | | 375/240.23 |
| 6,678,322 B1 * | 1/2004 | Mihara | | 375/240.02 |
| 6,731,685 B1 * | 5/2004 | Liu et al. | | 375/240.14 |
| 6,763,138 B1 * | 7/2004 | Yokoyama | | 382/236 |
| 6,915,018 B2 * | 7/2005 | Tajime | | 382/251 |
| 6,963,608 B1 * | 11/2005 | Wu | | 375/240.03 |

OTHER PUBLICATIONS

Section 7.4.2, ISO/IEC 13818-2 (1995) ITU-T H262 (1995) MPEG 2, pp. 83-86.*

* cited by examiner

*Primary Examiner*—Wenpeng Chen
*Assistant Examiner*—Yuzhen Ge
(74) *Attorney, Agent, or Firm*—Muncy, Geissler, Olds & Lowe, PLLC

(57) ABSTRACT

A quantization matrix adjusting method for quality improvement by scaling down the default quantization matrix. The adjusting method comprises the steps of: updating a used bits BB_X and an average quantizer scale Avg_Q; allocating a bit budget BB_C for a current picture; calculating an estimated quantizer scale EstQ_C according to the used bits BB_X, the average quantizer scale Avg_Q and the bit budget BB_C; deciding the operation mode, when the estimated quantizer scale EstQ_C is smaller than a threshold Th_Q, assigning the operation mode as an adjusting mode, otherwise remaining at normal mode; scaling down a default quantization matrix as a new quantization matrix when the operation mode is the adjusting mode; and coding the current picture using the new quantization matrix and default quantization matrix in the adjusting mode and normal mode, respectively.

7 Claims, 4 Drawing Sheets

|   | 0 | 1 | 2 | 3 | 4 | 5 | 6 | 7 |
|---|---|---|---|---|---|---|---|---|
| 0 | 8 | 16 | 19 | 22 | 26 | 27 | 29 | 34 |
| 1 | 16 | 16 | 22 | 24 | 27 | 29 | 34 | 37 |
| 2 | 19 | 22 | 26 | 27 | 29 | 34 | 34 | 38 |
| 3 | 22 | 22 | 26 | 27 | 29 | 34 | 37 | 40 |
| 4 | 22 | 26 | 27 | 29 | 32 | 35 | 40 | 48 |
| 5 | 26 | 27 | 29 | 32 | 35 | 40 | 48 | 58 |
| 6 | 26 | 27 | 29 | 34 | 38 | 46 | 56 | 69 |
| 7 | 27 | 29 | 35 | 38 | 46 | 56 | 69 | 83 |

FIG. 1 (PRIOR ART)

QUANTIZATION MATRIX ADJUSTING METHOD FOR QUALITY IMPROVEMENT

BACKGROUND OF THE INVENTION

1. Field of the Invention

The invention relates to a quantization matrix adjusting method, and more particularly to a quantization matrix adjusting method for quality improvement by scaling down the quantization matrix at an adjusting mode.

2. Description of the Related Art

Compressing methods are typically used to compress the pictures in order to reduce the data amounts, for example coding pictures by MPEG. The basic unit of coding within a picture is the macroblock. If the sampling is in 4:2:0 format, there are six blocks within a macroblock: four Y blocks, one Cb block and one Cr block. Each block is first DCT (discrete cosine transform) transformed, and then the DCT coefficients have to be quantized into integer. A zigzag scan or other alternate scanning method is utilized to arrange the two-dimensional quantized coefficients into one-dimensional. Finally, a variable-length coding (VLC) method is employed to do an entropy coding.

The quantization step is where the compression happened. Generally, the quantization of a DCT coefficient $F[v][u]$ can be represented as:

$$QF[v][u]=16*F[v][u]/(Q*W[v][u]) \quad (1)$$

Where the v, u are the indexes for the two dimensional matrix, ranged from 0 to 7. The Q is the quantizer scale for the blocks within a macroblock, which can be varied for each macroblock. The $W[v][u]$ is a quantization matrix defined for the whole pictures, which is used to assign a weighting factor for different DCT coefficients. FIG. 1 is a default quantization matrix for intra blocks defined in MPEG-2. Referring to FIG. 1, the $W[v][u]$ is getting larger when the v and u indexes are increasing. This causes that the quantized coefficients with higher frequency more easily becomes zero. This is based on the study of human visual system that human is more sensitive to lower frequency signal and less sensitive to higher frequency.

The inverse-quantization step is used to recover the DCT coefficients. Generally, the inverse-quantization of a quantized DCT coefficient $QF[v][u]$ is defined as:

$$F'[v][u]=QF[v][u]*Q*W[v][u]/16 \quad (2)$$

where $F'[v][u]$ is the recovered DCT coefficient. The difference between the original DCT coefficient $F[v][u]$ and the inverse-quantized DCT coefficient $F'[v][u]$ is called quantization error, which is defined as:

$$E[v][u]=F[v][u]-F'[v][u] \quad (3)$$

The adaptive quantization adapted in MPEG-1 and MPEG-2 can freely change the Q from one macroblock to the next macroblock, but can only slightly adjust the Q between adjacent macroblocks in MPEG-4. The MPEG-2 has a non-linear quantizer scale mapping the quantizer scale code (from 1 to 31) to a real quantizer scale (from 0.5 to 56).

Adjusting the quantizer scale Q can control the bit consumption and coded quality of a macroblock. Given a larger Q will cause the quantized DCT coefficients getting smaller, and more quantized DCT coefficients became zero. Thus, the coded bit stream after VLC becomes shorter. However, the consequence is that the quantization error is getting larger, and the decoded image quality getting worse. If we want to have a better image quality, setting a smaller Q can reduce the quantization error, but the coded bit stream will getting longer.

In typical applications, the bit-rate of MPEG bit stream is constrained. For example, the DVD standard defines that the bit-rate of a MPEG-2 video stream can not higher than 9.8 Mb/sec, so the encoder have to control the bit-rate consumption to satisfy the constrain.

The picture contents vary from picture to picture in a video sequence. The coding complexity in a portion of video sequence may be different to other portions. The video buffer verifier (hereinafter called VBV) employed in MPEG-1 can offer somewhat flexibility in bit-rate consumption for different pictures, but overall bit-rate in a long term should be a constant bit rate (hereinafter called CBR). The MPEG-2 introduces the variable bit rate (VBR) operation mode to provide more flexibility on the variation of bit-rate consumption for each picture. The VBV buffer is used to emulate the input buffer of the MPEG decoder, and the bit stream produced by a MPEG encoder can not violate the constraint on the VBV buffer, otherwise the bit stream will not be properly decoded. The CBR operation of the VBV is shown by example in FIG. 2. FIG. 2 depicts the fullness of the decoder buffer over time. The sloped line segments show the compressed data entering the buffer at a constant bit-rate. The vertical line segments show the instantaneous removal from the buffer of the data associated with the decoded picture.

For the bit stream to satisfy the MPEG rate control requirement, the data for a picture must be already available in the buffer when the decoder has to decode the picture, and the decoder buffer does not overfill. By referencing to FIG. 2, if a picture consumed too many bits, the VBV buffer may be underflow, therefore the upper bound of the allocatable bits is UB. Similarly, if a picture used too few bits, the VBV buffer may be overflow, and thus the lower bound of the allocatable bits is LB. The VBR operation of the VBV is shown by example in FIG. 3. The difference between VBR and CBR is that the compressed bit stream enters the buffer at a specified maximum bit-rate until the buffer is full, when no more bits are input. This translates to a bit-rate entering the buffer that may be effectively variable, up to the maximum specified rate. As shown in the FIG. 3, there is only a constraint on the allocatable maximal bit rate UB, but no minimal bit rate.

To satisfy the constraint of VBV, the encoder has to allocate a bit budget for each picture, and then try to control the actually consumed bits close to the allocated bit budget. Typically, a virtual buffer mechanism is employed to control the bit consumption. If the buffer occupancy lower than zero, it maps to the quantizer scale 1, and if the buffer occupancy higher than a threshold R, it maps to the quantizer scale 31. The R is called the reaction factor. Before coding a picture, the virtual buffer has an initial occupancy $D=d0=R*q0/31$, and this occupancy corresponds to a quantizer scale $Q=q0$. Use the Q to quantize the first macroblock and encode. If the consumed bits are larger than the average bit budget for a macroblock, the virtual buffer occupancy D increases, otherwise the D decreases. If the buffer occupancy D increases over $d0+R/31$, the quantizer scale Q will become $q0+1$. This means that the excess of bit consumption is too large, so increase the quantizer scale to try to reduce the rate of bit consumption. If the buffer occupancy D decreases lower than $d0-R/31$, the quantizer scale Q will became $q0-1$. This means that the bit consumption is lower than expected, so decrease the quantizer scale to try to increase the rate of bit consumption.

The problem of using the virtual buffer mechanism to control the bit consumption is how to assign the initial buffer occupancy d0. This initial occupancy can be treat as an estimation of the coding complexity of the current picture. With a fixed bit budget, if the coding complexity of the current picture is relatively high, a higher initial occupancy should be selected so that the quantizer scale for each macroblock is higher. But we don't know the coding complexity of the current picture until the picture is actually coded. One solution is to inherit the buffer occupancy of the previous coded picture. This simple technique can handle most cases with no serious problem, but would cause VBV underflow when there is a rapidly variation of image content in a video sequence, such as senses change.

The quantizer scale for a macroblock can be selected from 1 to 31; this dynamic range can handle the most cases of video coding. However, if a video sequence is very simple and the target bit rate is high, the quantizer scale will become very small to generate more bits. If the scene is too simple even if setting the quantizer scale to 1 can't generate enough bits, some stuffing bits have to be added. This is the wasting of bit rate. Another case is that the average quantizer scale is between 1 and 2, for example 1.5. In this case, the best-matched quantizer scale for most macroblocks would be 1.5, but there is no such value. The resolution of quantizer scale becomes coarser when the value getting smaller. The result is that the quantizer scale varied rapidly from 1 to 2 and then backs to 1. This will cause a slightly visible blocking artifact at the flat area of image.

SUMMARY OF THE INVENTION

In view of the above-mentioned problems, an object of the invention is to provide a quantization matrix adjusting method to improve the image quality and reduce the visible blocking artifact at the flat area of image.

To achieve the above-mentioned object, the quantization matrix adjusting method comprises the steps of: updating a used bits BB_X and an average quantizer scale Avg_Q; allocating the bit budget BB_C for the current picture; calculating an estimated quantizer scale EstQ_C according to the used bits BB_X, the average quantizer scale Avg_Q and the bit budget BB_C; deciding the operation mode, when the estimated quantizer scale EstQ_C is smaller than a threshold Th_Q, assigning the operation mode as an adjusting mode, otherwise remaining at normal mode; scaling down the default quantization matrix as a new quantization matrix when the operation mode is the adjusting mode; and coding the current picture using the new quantization matrix and default quantization matrix in the adjusting mode and normal mode, respectively.

BRIEF DESCRIPTION OF THE DRAWINGS

FIG. 1 is a default quantization matrix for intra blocks defined in MPEG-2.

DETAILED DESCRIPTION OF THE INVENTION

The quantization matrix adjusting method for quality improvement of the present invention will be described with reference to the accompanying drawings.

When the estimated quantizer scale EstQ_C for the current picture is very small, for example 1, and the encoder codes the current by the default quantization matrix, this will cause a slightly visible blocking artifact at the flat area of image. For overcoming this problem, the decoder using the adjusting method of the present invention scales down the default quantization matrix so as to scale up the estimated quantizer scale EstQ_C. For example, if the new quantization matrix is scale down by 4 from the default matrix, the estimated quantizer scale EstQ_C will shift from 1.5 to 6. Therefore, the quantizer scale can slightly increase to 7 or 8 to reduce the bit consumption rate, or decrease to 5 or 4 to consume more bits. The difference of quantization error between adjacent macroblocks is greatly reduced. However, changing quantization matrix has some constraint.

In MPEG-1 & MPEG-2, there must be a sequence header placed at the beginning of coded bit stream, and can be added in the subsequence of bit stream. Once a sequence header is encountered, the quantization matrixes will reset to the default value. In MPEG-1, the customized quantization matrix can only be set in the sequence header, and the sequence header can only inserted before a GOP header. This means that if we want to change the quantization matrix, we must start a new GOP, insert a sequence header before the GOP, and place the new quantization matrix in the sequence header. In the MPEG-2, the quantization matrix can not only placed in the sequence header, but also can be changed for each picture by insert a quantization matrix extension. So if we want to change the quantization matrix, we can only do it at the beginning of encoding a picture.

Figure 2:
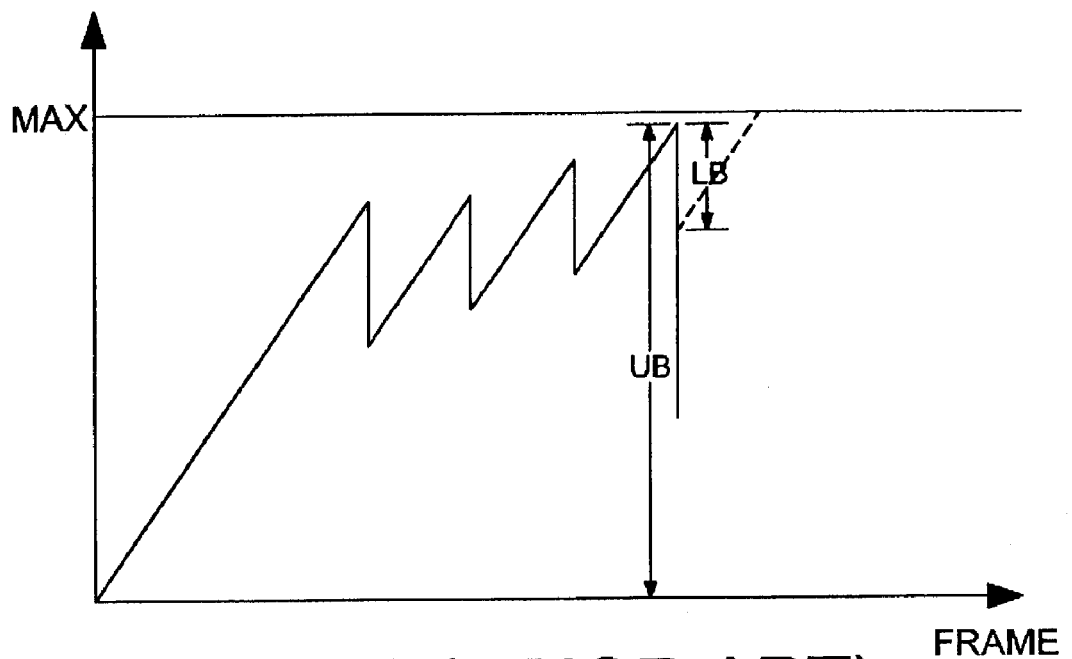
FIG. 2 is the constant bit rate operation of the video buffer verifier.
Figure 3:
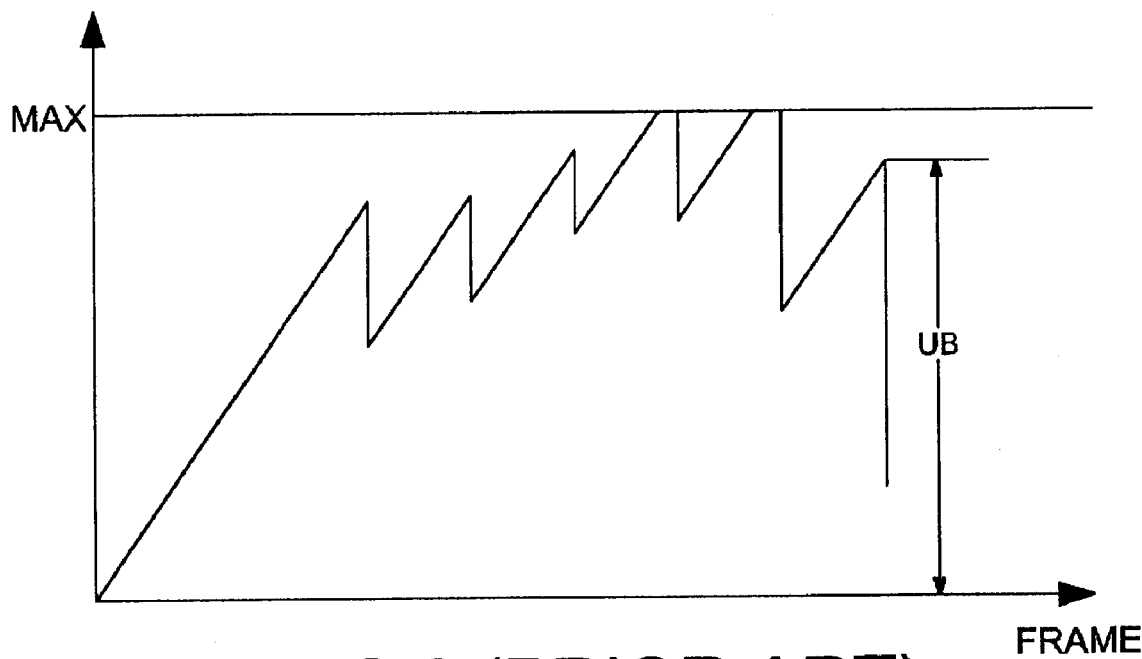
FIG. 3 is the variable bit rate operation of the video buffer verifier.
Figure 4:
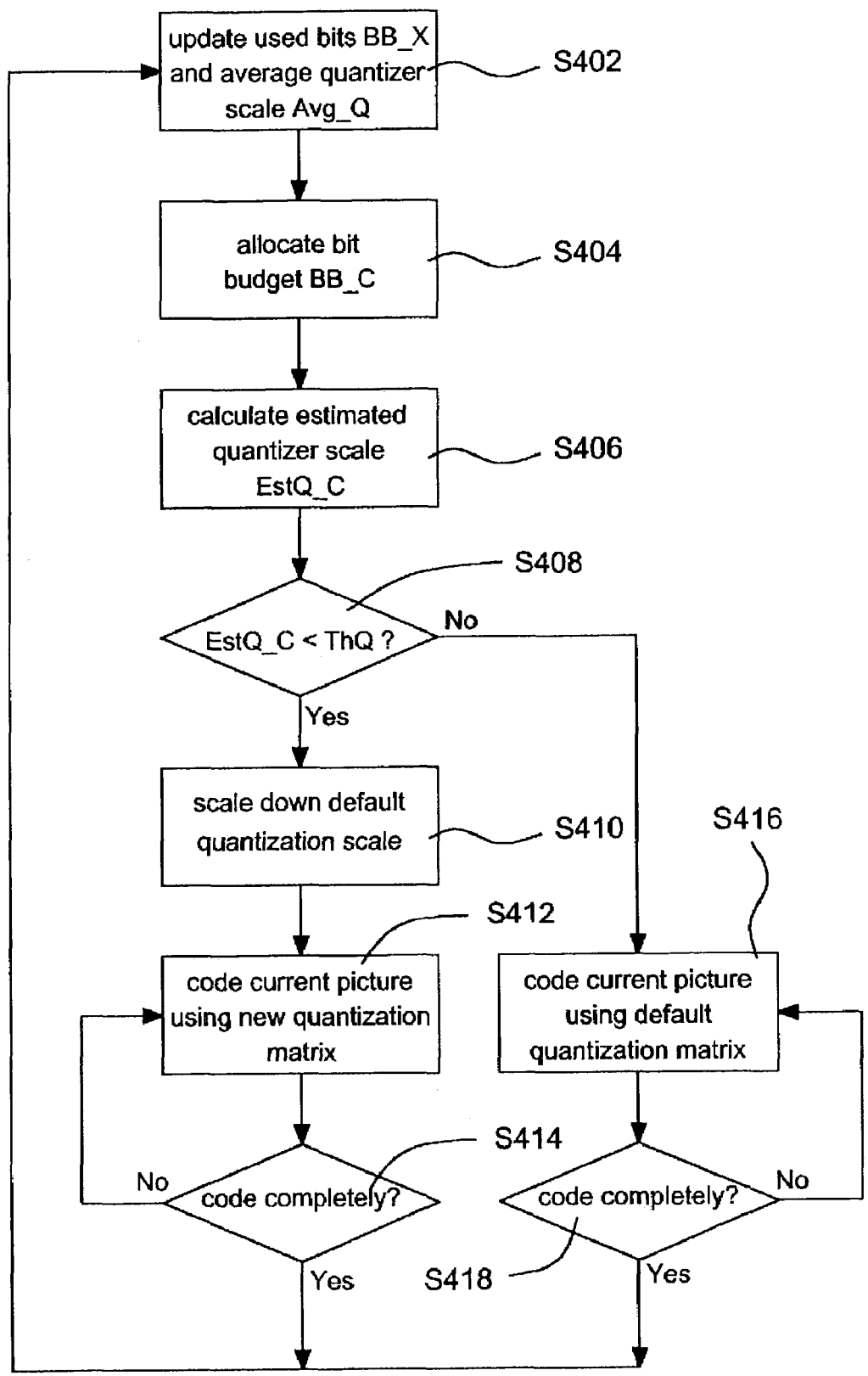
FIG. 4 is a flow chart of quantization matrix adjusting method according to the first embodiment of present invention.

FIG. 4 is a flow chart of quantization matrix adjusting method according to the first embodiment of present invention. The encoder using the adjusting method of this embodiment encodes a current picture without a pre-scan to analysis the complexity of the current picture. Because the encoder encodes the current picture without a pre-scan to analysis the complexity of the current picture, like the well-known Test Model 5 (TM5) rate control algorithm, the encoder can only use the information of the previous coded pictures to estimate the coding complexity of the current picture. The method of the first embodiment of the present invention includes the following steps.

Step S402: update the used bits of the previously coded picture BB_X and the average quantizer scale Avg_Q. After coding a picture with type of X (X is in I-, P- or B-picture), encoder can calculate the average quantizer scale Avg_Q, the final virtual buffer occupancy d_X of this picture and the used bits of the previously coded picture BB_X.

Step S404: allocate a bit budget BB_C for the current picture of type X. In the general cases, the initial virtual buffer occupancy $d0^X$ of the next coding picture with type X is set to the final virtual buffer occupancy d_X, and the initial quantizer scale Q is set to the value corresponding to the average quantizer scale Avg_Q. Then, the frame-level rate control will allocate the bit budget BB_C for the current picture.

Step S406: calculate the estimated quantizer scale EstQ_C for the current picture. By assuming the activity would be almost the same between adjacent pictures of the same type, the encoder using the adjusting method of the first embodiment uses the relation of the used bits of the previously coded picture BB_X, the bit budget BB_C of the current picture and the average quantizer scale Avg_Q to calculate the estimated quantizer scale EstQ_C of the current picture. Equation (4) is one method to calculate the estimated quantizer scale EstQ_C.

$$EstQ\_C = (BB\_X/BB\_C) * Avg\_Q \quad (4)$$

Step S408: decide the operation mode. If the estimated quantizer scale EstQ_C is smaller than a threshold Th_Q, such as 2, 3 or 4, the encoder will enter an adjusting mode to code the current picture. In the adjusting mode, it means that the picture content is pretty simple to be coded with the given bit rate. If the used bits of the previously coded picture BB_X and the bit budget BB_C assigned for the current picture are about the same, we should also believe that the final average quantizer scale Avg_Q would also be very small. Therefore, when the estimated quantizer scale EstQ_C is smaller than the threshold Th_Q, the encoder will jump to Step S410 to enter the adjusting mode, otherwise jump to Step S416 to remain the normal mode.

Step 410: scale down the quantization matrix as a new quantization matrix. In the adjusting mode, the encoder wants the final average quantizer scale of the current picture scale up to a safer value SQ_X, which should larger than or equal to the threshold Th_Q. Therefore, the encoder scales down the quantization matrix by an adjustment factor S, and the initial virtual buffer occupancy will be set with the value corresponding to d0_X/S. The adjustment factor S should be a value smaller than 1. The adjustment factor S is calculated as:

$$S = EstQ\_C/SQ\_X \quad (5)$$

The new quantization matrix is enlarged as:

$$W'[v][u] = W0[v][u] * S \quad (6)$$

where v=0.7, u=0.7. The W0[v][u] is the default quantization matrix or a user defined quantization matrix if desired. Therefore, the larger the safer value SQ_X is, the smaller the adjustment factor S is. The minimal value for the W'[v][u] is 1, so the new value has to cramp to larger than or equal to 1.

Usually, there are two default quantization matrixes in the encoder, one for intra-block and one for inter-block. Update a new quantization matrix requires 512 bits to encode the quantization matrix itself and some extra bits, so the number of updating quantization matrix would be kept as small as possible. Only intra quantization matrix is required for I-picture, and maybe only updating the inter quantization matrix is enough for the B-picture. In the case of P-picture, it would depend on how many intra-coded macroblocks existed in the picture. If the number of intra-coded macroblock is larger than a threshold, updating two quantization matrixes would be a better choice. Otherwise, only the inter quantization matrix has to be updated.

Step 412: encode the current picture using the new quantization matrix.

Step 414: check the encoding state. If the current picture is encoded completely, jump back to Step S402, otherwise jump to Step S412.

Step 416: encode the current picture using the default quantization matrix.

Step 418: check the encoding state. If the current picture is encoded completely, jump back to Step S402, otherwise jump to Step S416.

In the above steps, if the encoder enters into the adjusting mode, the quantization matrix will be scale down by the adjustment factor S. Because some macroblocks are quantized using the new quantization matrix, the quantizer scale Q of these macroblocks should also be scaled down by the adjustment factor S for calculating the Avg_Q to reflect the actual coding complexity. Remind that the quantizer scale Q used to quantize the macroblocks can not be smaller than 1, but the scaled down Q used to calculate the Avg_Q would be smaller than 1.

If the values of the adjustment factor S for some adjacent pictures are slightly different, changing the quantization matrix for every picture to reflect the small difference is not a good idea. It is a better choice to change the quantization matrix when the difference is larger than a threshold. Another solution is to "quantize" the adjustment factor S so that there are only some pre-defined quantization matrixes corresponding to some possible quantized adjustment factor S'. Quantize the adjustment factor S to the most closed adjustment factor S' and then used the corresponding quantization matrix. For example, if there are four possible adjustment factor S': 0.8, 0.6, 0.4 and 0.2, and the default quantization matrix is scaled down by these four value to get four new quantization matrix W1, W2, W3 and W4, respectively. If the adjustment factor S for five adjacent pictures are 0.67, 0.62, 0.54, 0.61 and 0.58, the quantization matrix for these five adjacent pictures are all W2, and only the first picture has to encode the W2 into bit stream. The following four pictures can use the W2 without any effort until a sequence header is encountered. The sequence header will reset the quantization matrixes and the following first picture has to encode the quantization matrix for itself.

Figure 5:
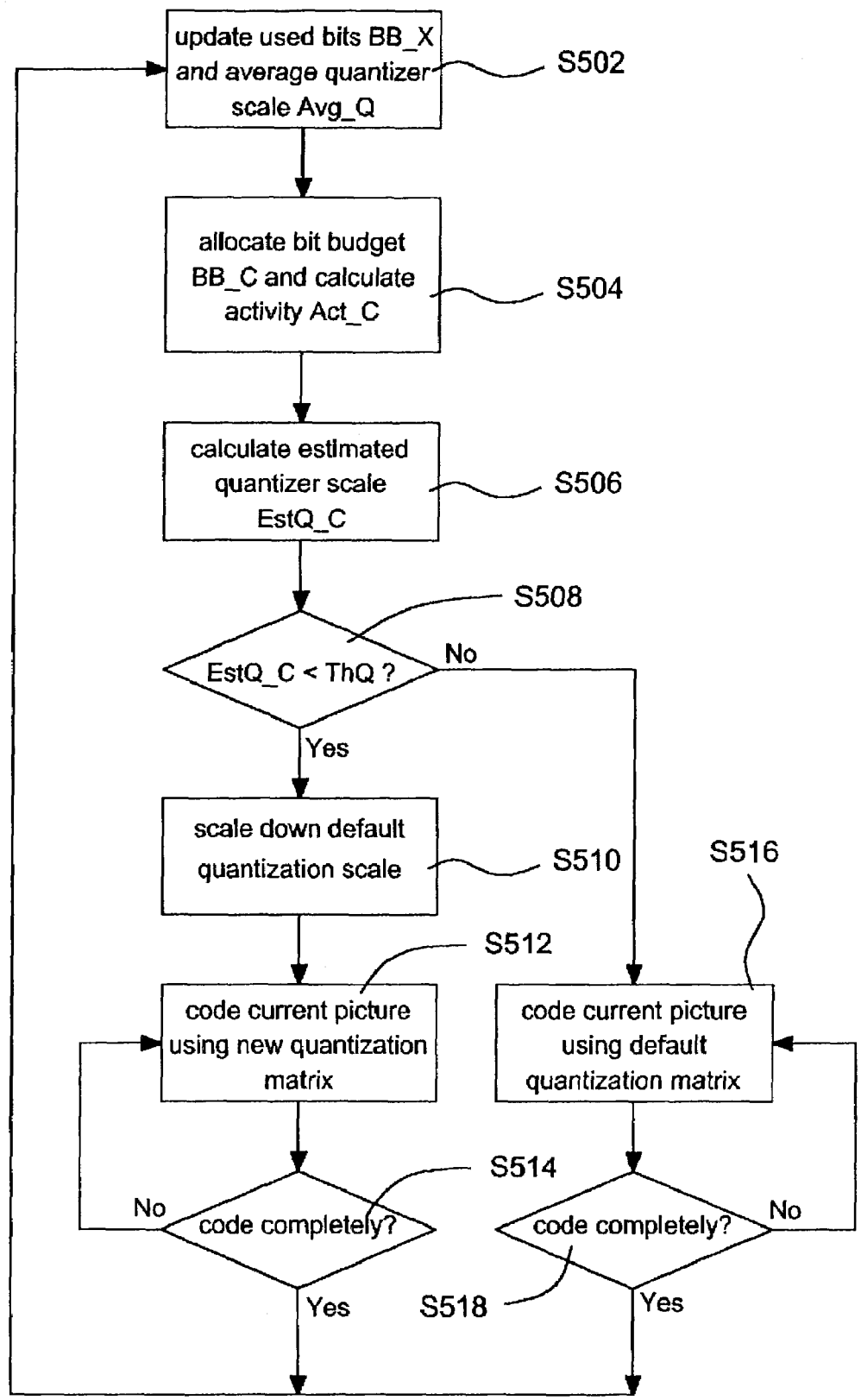
FIG. 5 is a flow chart of quantization matrix adjusting method according to the second embodiment of present invention.

FIG. 5 is a flow chart of Quantization Matrix adjusting Method according to the second embodiment of present invention. The encoder using the adjusting method of the second embodiment is to encode a current picture with a pre-scan to analysis the complexity of the current picture. If the encoder can do a pre-analysis on the current picture to collect the estimation of the complexity, a more correct decision can be made on whether to change the quantization and how to do it. Typically, the coding complexity of the current picture can be estimated while doing the motion estimation. For the I-picture, the variance of each intra-coded macroblock can be obtained. For the P- and B-pictures, a mode decision has to be made depends on the variances of the intra-coded and inter-coded mode. We call the sum of variances as the activities of the current pictures. Before coding a picture, we know the activity Act_C of the current picture. After coding a picture, the average quantizer scale Avg_Q and the actually used bits BB_X can be used to calculate the complexity Com of the current picture.

In the encoder without pre-analysis function, the encoder can only decide weather change to change the quantization matrix based on the previously coded pictures. However, if there is a rapid change on the coding complexity of adjacent pictures, this decision may be failed. If the average quantizer scale Avg_Q of the previously coded picture is slightly smaller than the threshold Th_Q, the current picture would not enter the adjusting mode. However, if the coding complexity of the current picture is much lower than the previously coded pictures, the final average quantizer scale after coding the current picture would became too low, causing the degrade on coding quality. In the contract, if the coding complexity of the previously coded picture is pretty low but the current picture is very high, an over-shrink quantization matrix would generate too many bits to cause the VBV underflow.

The difference between the first and second embodiments is that the second embodiment of the present invention is to first estimate the activity Act_C of the current picture and then to estimate the estimated quantizer scale EstQ_C according to the activity Act_C. The encoder calculates the estimated quantizer scale EstQ_C of the current picture by the following equation:

$$EstQ\_C=(BB\_X/BB\_C)*Avg\_Q*(Act\_C/Act\_X) \quad (7)$$

The difference between equation (7) and equation (4) is that equation (7) is used to calculate the estimated quantizer scale EstQ_C by the parameters, including not only the bit budget BB_C, used bits BB_X, but also the activity Act_X and Act_C. That is, when the bit budget BB_C and average quantizer scale Avg_Q of the current picture are same with that of previously picture, if the activity Act_C of the current picture is larger than the activity Act_X of previously picture, the estimated quantizer scale EstQ_C will be higher relatively to make the coded bit rate of the current picture not exceeding the bit budget much. In the contract, if the activity Act_C of the current picture is smaller than the activity Act_X of previously picture, the estimated quantizer scale EstQ_C will be lower relatively to make the coded bit rate of the current picture not under the bit budget much.

After calculating the estimated quantizer scale EstQ_C, the second embodiment is same with the first embodiment to decide whether the encoder enters the adjusting mode according to the estimated quantizer scale EstQ_C. That is, when the estimated quantizer scale EstQ_C is smaller than the Threshold Th_Q, the encoder enters the adjusting mode, otherwise remains the normal mode.

When the encoder enters the adjusting mode, the encoder will scale down the default quantization matrix as a new quantization matrix. In the adjusting mode, the encoder wants the final average quantizer scale of the current picture scales up to a safer value SQ_X, which should larger than or equal to the threshold Th_Q. Therefore, the encoder scales down the quantization matrix by an adjustment factor S, and the initial virtual buffer occupancy will be set with the value corresponding to d0_X/S. The adjustment factor S should be a value smaller than 1.0 and can be calculated by equation (5). The new quantization matrix can be calculated by equation (6). The minimal value for the W'[v][u] is 1, so the new value has to cramp to larger than or equal to 1.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A quantization matrix adjusting method for quality improvement, the adjusting method comprising the steps of:
   updating a used bits BB_X and an average quantizer scale Avg_Q;
   allocating the bit budget BB_C for a current picture;
   calculating an estimated quantizer scale EstQ_C according to at least the used bits BB_X, the average quantizer scale Avg_Q and the bit budget BB_C;
   deciding the operation mode, when the estimated quantizer scale EstQ_C is smaller than a threshold Th_Q, assigning the operation mode as an adjusting mode, otherwise remaining at normal mode;
   scaling down a default quantization matrix as a new quantization matrix when the operation mode is the adjusting mode; and
   coding the current picture using the new quantization matrix and default quantization matrix in the adjusting mode and normal mode, respectively;
   wherein the estimated quantizer scale can be calculated by the equation:

$$EstQ\_C=(BB\_X/BB\_C)*Avg\_Q;$$

wherein the new quantization matrix is calculated according to the default quantization matrix and an adjustment factor;
   wherein the adjustment factor equals the estimated quantizer scale EstQ_C divided by a safer value SQ_X;
   wherein the method comprises a plurality of quantized adjustment factor and a plurality of pre-calculated quantization matrixes, and in the adjusting mode the method selects a pre-calculated quantization matrix with the quantized adjustment factor closest to the adjustment factor as the new quantization matrix.

2. The quantization matrix adjusting method as in claim 1, wherein the safer value SQ_X is 4.

3. A quantization matrix adjusting method for quality improvement, the adjusting method comprising the steps of:
   updating a used bits BB_X and an average quantizer scale Avg_Q;
   allocating a bit budget BB_C for a current picture;
   calculating an estimated quantizer scale EstQ_C according to at least the used bits BB_X, the activity Act_C the average quantizer scale Avg_Q and the bit budget BB_C;
   deciding the operation mode, when the estimated quantizer scale EstQ_C is smaller than a threshold Th_Q, assigning the operation mode as an adjusting mode, otherwise remaining at normal mode;
   scaling down a default quantization matrix as a new quantization matrix when the operation mode is the adjusting mode;
   coding the current picture using the new quantization matrix and default quantization matrix in the adjusting mode and normal mode, respectively;
   updating an activity Act_X of a previous picture; and
   calculating an activity Act_C for the current picture;
   wherein the estimated quantizer scale can be calculated by the equation:

$$EstQ\_C=(BB\_X/BB\_C)*Avg\_Q*(Act\_C/Act\_X);$$

wherein the new quantizer matrix is calculated according to the default quantization matrix and an adjustment factor;
   wherein the adjustment factor equals the estimated quantizer scale EstQ_C divided by a safer value SQ_X;
   wherein the method comprises a plurality of quantized adjustment factor and a plurality of pre-calculated quantization matrixes, and in the adjusting mode the method selects a pre-calculated quantization matrix with the quantized adjustment factor closest to the adjustment factor as the new quantization matrix.

4. The quantization matrix adjusting method as in claim 3, wherein the activity Act_C is the variance of each intra-coded macroblock for I-pictures.

5. The quantization matrix adjusting method as in claim 3, wherein the activity Act_C is the variances of the intra-coded or the inter-coded mode.

6. The quantization matrix adjusting method as in claim 3, wherein the activity Act_X and the activity Act_C serve as additional reference values for calculating the estimated quantizer scale EstQ_C.

7. The quantization matrix adjusting method as in claim 3, wherein the safer value SQ_X is 4.

* * * * *